June 21, 1960 L. N. RICCI ET AL 2,942,225

PLUG-IN LOW-IMPEDANCE BUS DUCT

Filed Dec. 20, 1957 2 Sheets-Sheet 1

B' C' A' 32 33 34 35 A B C

WITNESSES:
Bernard R. Gieguay
Edwin E. Bamler

INVENTORS
Louis N. Ricci and
Bill M. Shannon.
BY [signature]
ATTORNEY

PLUG-IN LOW-IMPEDANCE BUS DUCT
Filed Dec. 20, 1957 2 Sheets-Sheet 2
Fig. 2.
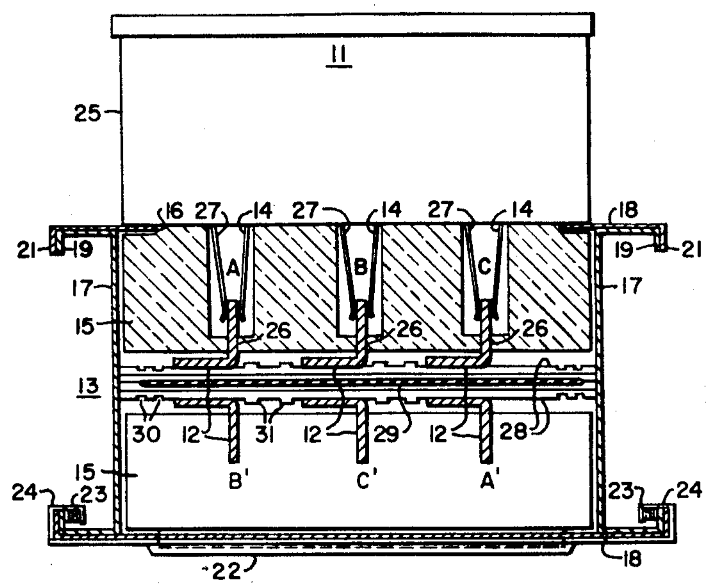
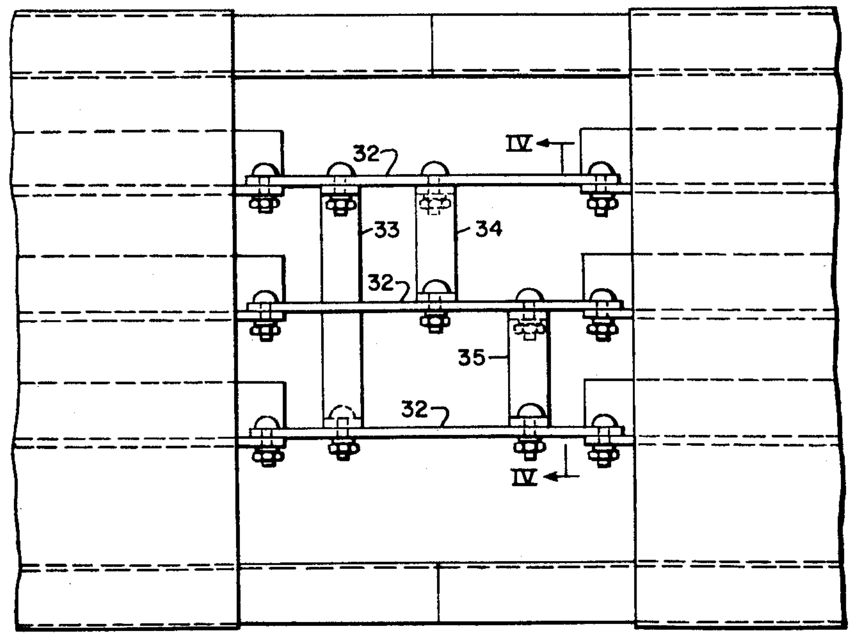
Fig. 3.

United States Patent Office 2,942,225

Patented June 21, 1960

1

2,942,225

PLUG-IN LOW-IMPEDANCE BUS DUCT

Louis N. Ricci, Chippewa Township, Beaver County, and Bill M. Shannon, Rochester Township, Beaver County, Pa., assignors to Westinghouse Electric Corporation, East Pittsburgh, Pa., a corporation of Pennsylvania Filed Dec. 20, 1957, Ser. No. 704,099

7 Claims. (Cl. 339—22)

This invention relates, generally, to bus duct and, more particularly, to bus duct of the low-impedance type.

In order to reduce the voltage drop when conducting relatively large amounts of current, the bus bars in a bus duct structure may be so arranged that bars from phases A and B, B and C, and C and A are paired together and spaced relatively closely together. Most of the prior structures utilizing such an arrangement have not been suitable for the attachment of current take-off devices known as plug-in units.

An object of the invention is to provide a low-impedance bus duct to which plug-in units having stab connectors for engaging the bus bars may be readily attached.

Another object of the invention is to provide for interconnecting corresponding phase bus bars at the joints between sections of a bus duct structure.

Other objects of the invention will be explained fully hereinafter or will be apparent to those skilled in the art.

In accordance with one embodiment of the invention, six angle-shaped bars are so mounted in a bus duct housing that one leg of each angle bar is positioned for engagement by a stab connector of a plug-in unit and the other leg is disposed close to a similar leg of an angle bar of a different phase, thereby providing plug-in duct having low impedance. The angle bars of corresponding phases are interconnected at the joints between sections of the duct.

For a better understanding of the nature and objects of the invention, reference may be had to the following detailed description, taken in conjunction with the accompanying drawing, in which:

Fig. 2 is an enlarged view, partly in section and partly in elevation, of the bus duct including a plug-in unit;

Fig. 3 is a view, in plan, of a joint between two sections of bus duct; and

Figures 1, 4:
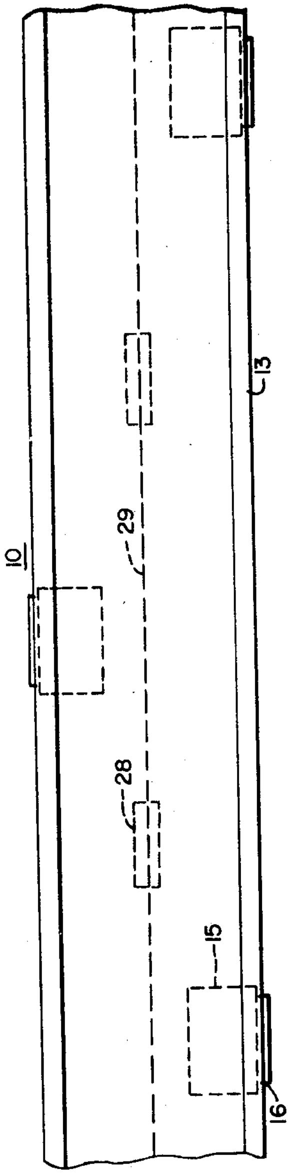
Figure 1 is a view, in elevation, of part of a section of bus duct embodying the principal features of the invention.
Fig. 4 is a view, in section, taken along the line IV—IV in Fig. 3.

Referring to the drawing, the structure shown therein comprises a portion of a bus duct 10 and a plug-in unit 11 which is disposed on one side of the duct 10. A plurality of angle-shaped bus bars 12 are mounted inside the duct housing 13 which is generally rectangular in cross section. The plug-in unit 11 is provided with stab connectors 14 which engage certain of the bus bars as will be described more fully hereinafter. The bus bars 12 are supported by insulators 15 which are disposed inside the housing 13 at openings 16 provided in opposite sides of the housing.

As shown most clearly in Fig. 2, the housing 13 comprises generally channel-shaped walls 17 and side walls 18. The channel-shaped walls 17 have inwardly extending flanges 19 which are overlapped by flanges 21 on the side walls 18. As previously explained, the openings 16 for receiving the stab connectors 14 are located at regular intervals in staggered relation in the side walls 18 on opposite sides of the duct. A cover plate 22 is provided for each opening 16 in the side walls 18. The cover plates 22 are slidably mounted on the side walls 18 and may be retained in position by leaf springs 23 which are disposed between flanges 24 on the cover plate and the edges of the flanges 19 and 21 on the housing 13. When it is desired to install a plug-in unit in a particular opening, the cover plate may be slid along the housing 13 to provide access to the opening 16.

2

The plug-in unit 11 may be of the type described in Patent 2,641,636, issued June 9, 1953, to W. F. Born et al. A circuit interrupter (not shown), which may be either an automatic circuit breaker or a manually operable switch, is mounted inside the metal casing 25 of the plug-in unit. The circuit interrupter is electrically connected to the stab connectors 14, thereby connecting the interrupter to bus bars 12 when it is properly installed on the bus duct housing 13.

It will be understood that power conductors (not shown) may be connected to load terminals on the interrupter unit to supply power for operating electrical apparatus. In this manner the plug-in unit may be located at a convenient position along the bus duct for supplying power to various machines or other apparatus in a factory. The plug-in unit may be retained on the duct housing by suitable clamping devices (not shown). The clamping device may be of the type described in Patent 2,725,541 issued November 29, 1955, to W. F. Born et al.

As previously explained, the bus bars 12 are supported in the housing 13 by the insulators 15. An insulator 15 is located at each opening 16 in each side of the duct housing. As shown in Fig. 2, each insulator 15 is provided with three transverse grooves 26 for receiving three of the bus bars 12. Each insulator 15 is also provided with three openings 27 for receiving the stab connectors 14 of a plug-in unit.

As also shown in Fig. 2, the bus bars 12 are disposed in three pairs. One leg of each angle bar extends perpendicularly to the sides of the housing containing the openings 16 and is disposed in an opening 27 in an insulator 15 for engagement by a stab connector 14 of a plug-in unit. The other legs of the angle-shaped bars are spaced relatively closely together and are disposed in planes parallel to the sides of the duct housing containing the openings 16. As shown in Fig. 2, the distance between the oppositely disposed legs of each pair of angle-shaped bars is less than the distance between the legs of the bars which are disposed in the openings 27 in the insulators 15 for engagement by the stab connectors of a plug-in unit. Thus, when the bus bars of one pair are connected to phases A and B and the bus bars of another pair are connected to phases B and C and the bus bars of the third pair are connected to phases C and A, as shown in Fig. 2, the relatively close spacing of the bars of each pair reduces the reactance, thereby decreasing the voltage drop in the system.

In addition to the insulators 15, spacing insulators 28 are provided at predetermined intervals along the duct housing. The insulators 28 are disposed between the legs of the angle bars 12 which are parallel to the sides of the duct housing. Thus, the bus bars are firmly held inside the housing 13 between the insulators 15 with the spacing insulators 28 disposed between the two groups of bus bars. Accordingly, the structure is enabled to withstand a relatively high stress produced by short circuit currents since the bus bars cannot move in either direction. Furthermore, the bus bars cannot move when they are being engaged by the stab connectors of the plug-in units.

As shown in Figs. 1 and 2, sheet insulation 29 may be provided between the closely spaced legs of the angle-shaped bus bars. The insulation 29 is supported by the spacing insulators 28 which may be formed in two halves with the insulation 29 disposed between the two halves of each insulator 28. As shown in Fig. 2, each insulator 28 may be provided with transverse grooves 30 and transverse ridges 31 to increase the creepage distance along the surface of the insulator.

As shown in Figs. 3 and 4, the ends of the bus bars of two housing sections may be joined by connecting bars 32 which may be bolted to the angle-shaped bars. The connecting bars 32 for the phase bars A and A′ are connected together by a generally Z-shaped connector 33. The connecting bars 32 for phase bars B and B′ are connected together by a generally Z-shaped connector 34. Likewise, the connecting bars 32 for phase bars C and C′ are connected together by a Z-shaped connector 35. In this manner, the two angle-shaped bars for each phase are connected together at each joint between housing sections in a bus duct installation, thereby equally distributing the current carried by the bus bars.

It is apparent that the present structure is suitable for conducting large amounts of current with a relatively small voltage drop as the bus bars are so arranged that the system has a relatively low impedance. Since the portions of the angle bars which are spaced closely together are separated by insulating material, it is not necessary to apply insulating tape to the individual bus bars, thereby decreasing the temperature rise of the structure when conducting large amounts of current. The angle-shaped bus bars are so disposed that they may be engaged by the stab connectors of plug-in units installed on the sides of the duct housing. Therefore, the present structure has the advantages of plug-in bus duct and low impedance duct. Furthermore, the bus bars are so supported within the housing that the structure is enabled to withstand relatively high short circuit stresses.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a bus duct section, in combination, a generally rectangular housing having spaced openings in opposite sides thereof, an insulator at each opening in the housing, each insulator having openings therein for receiving stab connectors of a plug-in unit, at least six angle-shaped bars disposed in the housing in pairs, the bars in each pair being of different phases, one leg of each angle bar extending perpendicularly to the sides of the housing having the openings therein and being accessible through one of the openings in each insulator, the other legs of the bars in each pair being spaced relatively closely together, and insulating means separating said closely spaced legs.

2. In a bus duct section, in combination, a generally rectangular housing having spaced openings in opposite sides thereof, an insulator at each opening in the housing, each insulator having openings therein for receiving stab connectors of a plug-in unit, at least six angle-shaped bars disposed in the housing in pairs, the bars in each pair being of different phases, one leg of each angle bar being accessible through one of the openings in each one of said insulators for engagement by the stab connectors of a plug-in unit, and the other legs of the angle bars lying in planes parallel to the sides of the housing having the openings therein.

3. In a bus duct section, in combination, a generally rectangular housing having spaced openings in opposite sides thereof, an insulator at each opening in the housing, each insulator having openings therein for receiving stab connectors of a plug-in unit, at least six angle-shaped bars disposed in the housing in pairs, the bars in each pair being of different phases, one leg of each angle bar being accessible through one of the openings in each one of said insulators for engagement by stab connectors, the other legs of the angle bars in each pair being spaced closely together and lying in planes parallel to the sides of the housing having the openings therein, insulating means disposed between said closely spaced legs, and spacing insulators for supporting said insulating means.

4. In a bus duct section, in combination, a generally rectangular housing having spaced openings in opposite sides thereof, an insulator at each opening in the housing, each insulator having openings therein for receiving stab connectors of a plug-in unit, at least six angle-shaped bars disposed in the housing in pairs, the bars in each pair being of different phases, one leg of each angle bar being disposed in one of the openings in each one of said insulators and extending perpendicularly to the sides of the housing having the openings therein, and the other legs of said angle bars in each pair being spaced closer together than said first-named legs.

5. In a bus duct section, in combination, a generally rectangular housing having spaced openings in opposite sides thereof, an insulator at each opening in the housing, each insulator having openings therein for receiving stab connectors of a plug-in unit, at least six angle-shaped bars disposed in the housing in pairs, the bars in each pair being of different phases, one leg of each angle bar being disposed in one of the openings in each one of said insulators and extending perpendicularly to the sides of the housing having the openings therein, the other legs of said angle bars in each pair being spaced closer together than said first-named legs, insulating means separating the closely spaced legs, and spacing insulators for supporting said insulating means.

6. In a bus duct section, in combination, a generally rectangular housing having spaced openings in opposite sides thereof, an insulator at each opening in the housing, each insulator having openings therein for receiving stab connectors of a plug-in unit, at least six bus bars disposed in the housing in pairs, the bars in each pair being of different phases, each bar having a portion thereon extending perpendicularly to the sides of the housing having the openings therein and being accessible through one of the openings in each insulator, and the other portions of the bars in each pair being spaced closely together.

7. In a bus duct section, in combination, a generally rectangular housing having spaced openings in opposite sides thereof, an insulator at each opening in the housing, each insulator having openings therein for receiving stab connectors of a plug-in unit, at least six bus bars disposed in the housing in pairs, the bars in each pair being of different phases, each bar having a portion thereon extending perpendicularly to the sides of the housing having the openings therein and being accessible through one of the openings in each insulator, and the other portions of the bars in each pair being spaced closely together and lying in planes parallel to the sides of the housing having the openings therein.

References Cited in the file of this patent

UNITED STATES PATENTS

| | | |
|---|---|---|
| 2,039,025 | Papst | Apr. 28, 1936 |
| 2,287,502 | Togesen et al. | June 23, 1942 |
| 2,310,919 | Adam | Feb. 16, 1943 |
| 2,318,860 | Huguelet | May 11, 1943 |
| 2,439,956 | Wagner et al. | Apr. 20, 1948 |
| 2,725,541 | Born et al. | Nov. 29, 1955 |